(12) United States Patent
Stolkin et al.

(10) Patent No.: US 8,333,256 B2
(45) Date of Patent: Dec. 18, 2012

(54) POLYMORPHIC TRACKED VEHICLE

(76) Inventors: Rustam Stolkin, London (GB); Kirk Deligiannis, Windsor, CT (US); Colin Finley Harrier, Denver, CO (US); Mathew Hochberger, Perth Amboy, NJ (US)

( * ) Notice: Subject to any disclaimer, the term of this patent is extended or adjusted under 35 U.S.C. 154(b) by 426 days.

(21) Appl. No.: 12/540,391

(22) Filed: Aug. 13, 2009

(65) Prior Publication Data
US 2011/0037311 A1  Feb. 17, 2011

(51) Int. Cl.
*B62D 55/075* (2006.01)

(52) U.S. Cl. ......... 180/9.32; 180/6.7; 180/9.1; 180/9.46

(58) Field of Classification Search .............. 180/9.32, 180/6.7, 9, 9.1, 9.46
See application file for complete search history.

(56) References Cited

U.S. PATENT DOCUMENTS

| | | | | |
|---|---|---|---|---|
| 3,166,138 A | * | 1/1965 | Dunn, Jr. ............... | 180/9.23 |
| 3,288,234 A | * | 11/1966 | Feliz .................... | 180/6.5 |
| 3,417,832 A | * | 12/1968 | Ziccardi ................ | 180/9.3 |
| 3,869,011 A | | 3/1975 | Jensen | |
| 4,194,584 A | * | 3/1980 | Kress et al. ............ | 180/9.23 |
| 4,445,582 A | * | 5/1984 | Andersson ............ | 180/9.5 |
| 4,483,407 A | * | 11/1984 | Iwamoto et al. ....... | 180/9.5 |
| 4,702,331 A | * | 10/1987 | Hagihara et al. ....... | 180/9.32 |
| 4,709,773 A | | 12/1987 | Clement et al. | |
| 4,823,852 A | * | 4/1989 | Langford ............... | 144/4.1 |
| 4,932,831 A | * | 6/1990 | White et al. .......... | 414/732 |
| 4,993,912 A | * | 2/1991 | King et al. ............ | 414/729 |
| 5,022,812 A | * | 6/1991 | Coughlan et al. ..... | 414/729 |
| 5,248,008 A | * | 9/1993 | Clar .................... | 180/9.32 |
| 5,395,129 A | * | 3/1995 | Kao .................... | 280/5.22 |
| 5,884,718 A | * | 3/1999 | Yamashiro et al. .... | 180/9.32 |
| 6,032,752 A | | 3/2000 | Karpik et al. | |
| 6,431,296 B1 | | 8/2002 | Won | |
| 6,589,098 B2 | * | 7/2003 | Lee et al. ............. | 446/465 |
| 7,316,405 B2 | * | 1/2008 | Kritman et al. ........ | 280/5.22 |
| 7,348,747 B1 | * | 3/2008 | Theobold et al. ..... | 318/568.21 |
| 7,475,745 B1 | * | 1/2009 | DeRoos ............... | 180/9.34 |
| 7,493,976 B2 | * | 2/2009 | Goldenberg et al. ... | 180/9.1 |
| 7,546,891 B2 | * | 6/2009 | Won .................... | 180/9.32 |
| 7,575,076 B2 | * | 8/2009 | Kang et al. ........... | 180/9.34 |
| 7,581,605 B2 | * | 9/2009 | Caspi et al. ........... | 180/9.1 |
| 7,600,593 B2 | * | 10/2009 | Filippov et al. ....... | 180/9.1 |
| 7,784,570 B2 | * | 8/2010 | Couture et al. ........ | 180/9.1 |
| 7,891,446 B2 | * | 2/2011 | Couture et al. ........ | 180/9.32 |
| 2004/0168837 A1 | * | 9/2004 | Michaud et al. ....... | 180/9.46 |
| 2004/0216932 A1 | * | 11/2004 | Giovanetti et al. ..... | 180/9.1 |
| 2004/0239092 A1 | | 12/2004 | Haringer | |
| 2007/0029117 A1 | | 2/2007 | Goldenberg et al. | |
| 2008/0183332 A1 | * | 7/2008 | Ohm et al. ............ | 700/250 |

* cited by examiner

*Primary Examiner* — Lesley D Morris
*Assistant Examiner* — Michael Stabley

(57) ABSTRACT

A method and apparatus is disclosed, for construction and operation of an all terrain polymorphic tracked vehicle. The invention improves on the prior art by providing a mechanism whereby it is possible to vary the shapes of the tracks during operation of the vehicle. This capability facilitates negotiating obstacles and rough terrain, enables such vehicles to climb stairs or similar obstacles, and also enables self leveling of the vehicle on inclined terrain.

19 Claims, 8 Drawing Sheets

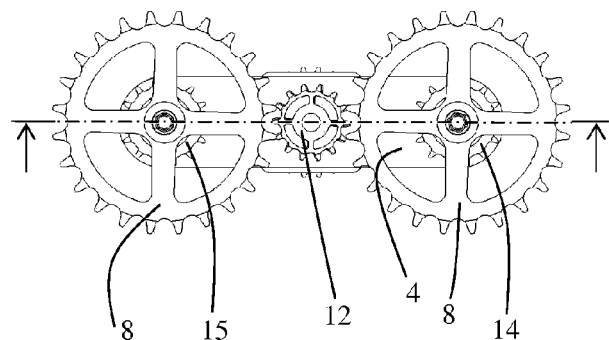
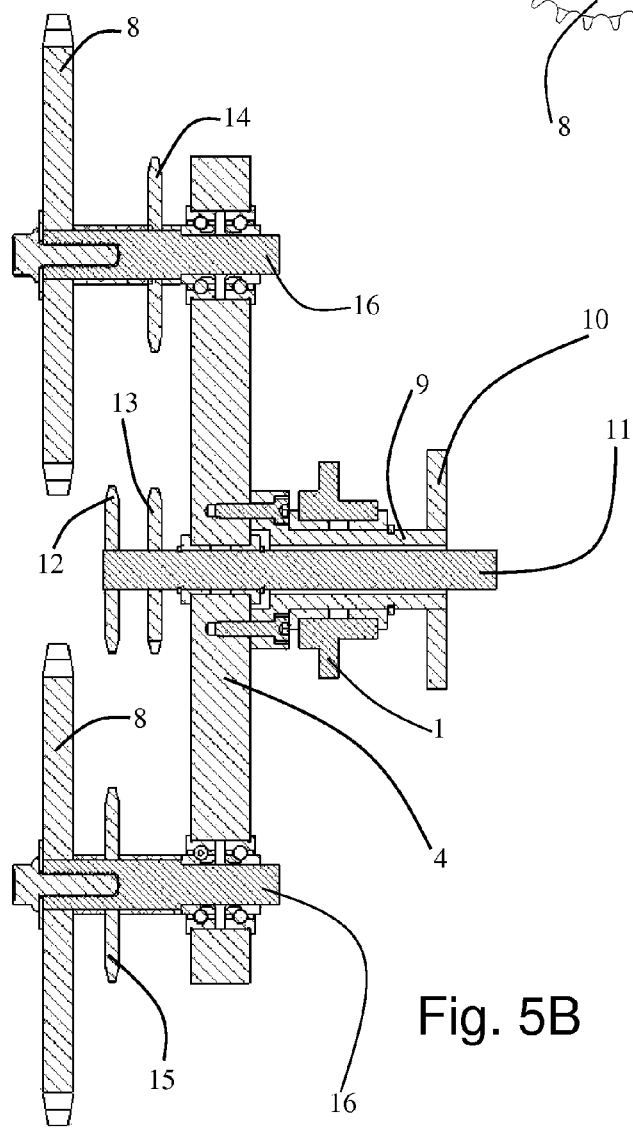
Fig. 5A
Fig. 5B

POLYMORPHIC TRACKED VEHICLE

FIELD OF THE INVENTION

The present invention relates to the field of tracked vehicles, sometimes also known as tractor crawlers, track-type tractors or track-laying vehicles (i.e. vehicles that run on tracks instead of wheels). In particular, the invention involves a "polymorphic" track mechanism by which a vehicle's tracks may be made to change shape. Comparable mechanisms in the prior art are sometimes referred to as articulated, variable geometry or variable configuration track mechanisms, in which a vehicle's tracks can be made to take up multiple configurations, having different geometries.

BACKGROUND OF THE INVENTION

Tracked vehicles are known to be advantageous for negotiating rough terrain and load bearing. Such vehicles are useful in applications such as military, agricultural or construction vehicles. It is also possible to employ remotely operated or robotic tracked vehicles in situations where it is dangerous to use a manned vehicle or to deploy a human pedestrian. Such applications include bomb disposal, some rescue operations, and the deployment of remote weapons platforms, for example robot vehicles carrying remotely operated weapons turrets. Military requirements for such weapons deploying robots call for extreme obstacle negotiating capabilities, including the capability to ascend steep stairs.

The use of conventional track mechanisms in such applications is limited, in that different situations may best be tackled with different shapes of track profile. For example, when driving up steep stairs, it is advantageous to have a long tracked base and a low center of gravity, to avoid the robot toppling over backwards. In contrast, when driving over rough terrain, it may be advantageous to have high ground clearance, necessitating a comparatively high center of gravity. It would therefore be advantageous to have a single vehicle for which the shape of the tracks could be varied during operation.

Additionally, when operating a vehicle mounted weapons or surveillance turret, problems may arise when the vehicle is on inclined terrain, as the plane in which the turret pans may become skewed to the horizontal. In such instances it would be desirable to have a vehicle with a self leveling mechanism, whereby the main body of the vehicle, and hence the plane of a turret, mounted thereon, could be leveled with respect to the horizon.

The present invention comprises a novel polymorphic track mechanism, whereby it is possible to vary the shapes of the tracks during operation. Furthermore, since it is possible to vary the shapes (and hence the depths) of the left and right tracks independently of each other, this invention enables such a vehicle to be operated so as to effect self leveling.

DESCRIPTION OF PRIOR ART

There are a variety of mechanisms described in the prior art that address the problem of climbing stairs and negotiating various other obstacles, using tracked vehicles. Several of these methods, such as those disclosed in U.S. Pat. No. 3,869,011—Jensen (1973) and U.S. Pat. No. 4,709,773—Clement and Villedieu (1986), involve the use of multiple tracked bodies, and an untracked body (often a seat or platform), articulated about a common axis. Motors are used to rotate these articulated bodies with respect to each other, thereby presenting different possible vehicle geometries to encountered obstacles. Another mechanism is disclosed in U.S. Pat. No. 6,431,296 B1—Won (2001), which consists of a vehicle equipped with a main pair of tracks, comprising the rear section of the vehicle, and a smaller, auxiliary pair of tracks (sometimes referred to in related literature as "flippers") comprising the forward section of the vehicle, the rear and forward sections being articulated about a common axis. The orientation of the flippers can be manipulated, in order to facilitate climbing stairs and other obstacles. In contrast, the present invention utilizes only a single track on either side of the vehicle, but this track is "polymorphic" in that it can be made to change shape.

The prior art also discloses embodiments of mechanisms that enable a single track to change shape. U.S. Patent No. 2004/0239092 A1—Haringer (2004), describes a crawler-tracked vehicle with variable track width for use in construction and agriculture. U.S. Patent No. 2007/0029117 A1—Goldenberg and Lin (2007), describes a variable configuration articulated tracked vehicle which can be used to overcome obstacles such as climbing stairs or crossing trenches. In both of these methods, the shape of each track is essentially triangular. The three vertices of the triangular track shape are supported by a driving wheel, a supporting wheel and a deflecting wheel respectively. Additional supporting wheels may also be incorporated. In U.S. Patent No. 2007/0029117 A1, the deflecting wheel is moved in such a way as to modify the triangular shape of the track without changing the overall track length. In U.S. Patent No. 2004/0239092 A1, the deflecting wheel is moved, but the distance between the driving wheel and the supporting wheel is also simultaneously varied in order to produce a change in track shape. In contrast to both U.S. Patent No. 2004/0239092 A1 and U.S. Patent No. 2007/0029117 A1, the present invention comprises a polymorphic track mechanism in which the track takes up a trapezoidal shape, the track being supported by four wheels, one wheel at each of the corners of the trapezoid. The four wheels include a pair at the front of the vehicle and a pair at the back of the vehicle. Each such pair is mounted on opposite ends of an arm which can be rotated about its center. Rotating these arms causes the shape of the trapezoidal track locus to be altered (moving the two parallel sides of the trapezoid either closer together or further apart). Thus, the present invention comprises a substantially different mechanism from both U.S. Patent No. 2004/0239092 A1 and U.S. Patent No. 2007/0029117 A1.

U.S. Pat. No. 6,032,752—Karpik et al. (1997), describes a vehicle suspension system with variable geometry. The disclosed embodiment describes a mechanism by which the shape of a snowmobile track can be changed in order to vary the performance characteristics of the suspension. This mechanism is very different from the present invention, addressing a track geometry which is essentially that of a parallelogram. An actuated slider mechanism is used to vary the geometry of the mechanism.

Note that none of the prior art discussed above describes track mechanisms which may be operated so as to effect self leveling of the vehicle's main body when the vehicle is on inclined terrain, and so this is also a novel feature of the present invention.

BRIEF DESCRIPTION OF THE DRAWINGS

For a more complete understanding of the present invention, reference is made to the following detailed description of various exemplary embodiments considered in conjunction with the accompanying drawings.

1) a vehicle chassis comprising a main body;
2) a right track;
3) a left track;
4) a front actuated arm on the right side of the vehicle;
5) a rear actuated arm on the right side of the vehicle;
6) a rear actuated arm on the left side of the vehicle (partially obscured by vehicle main body);
7) a front actuated arm on the left side of the vehicle (partially obscured by vehicle main body);
8) wheels, rotatably attached to actuated arms, that engage with and support the tracks, which are henceforth sometimes referred to as "track sprockets".

Figure 1:
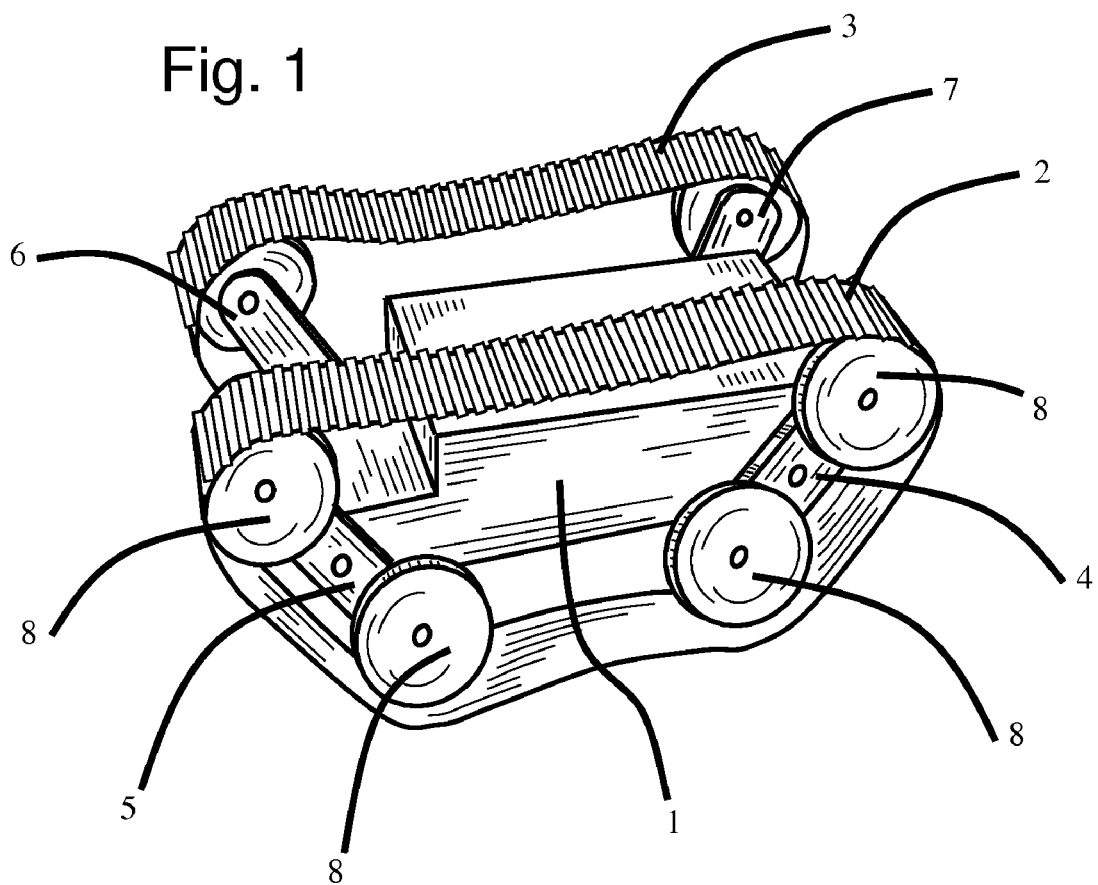
FIG. 1 shows a prototype polymorphic tracked vehicle, which is one possible embodiment of the present invention. Features of the invention that are visible in this figure include.
Figure 2A:
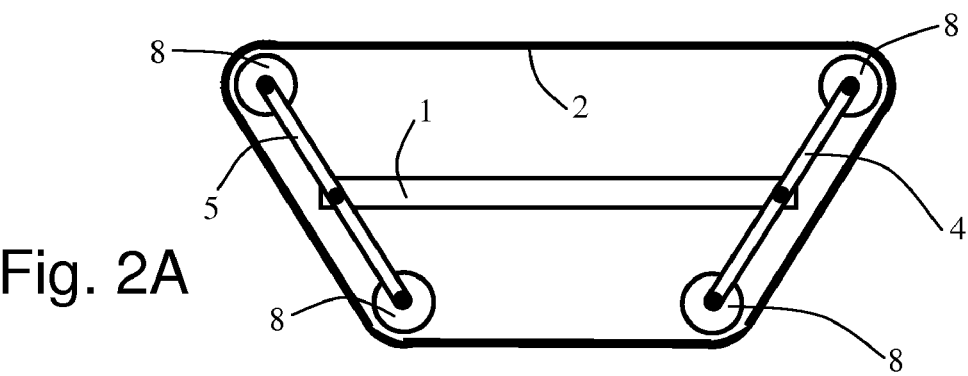
Figure 2B:
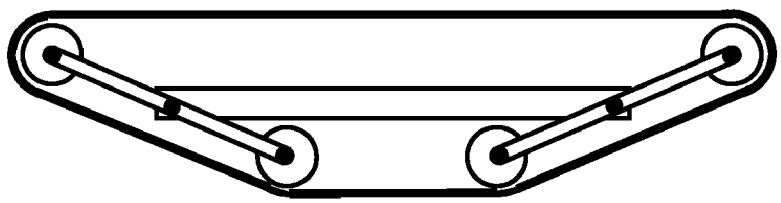
Figure 2C:
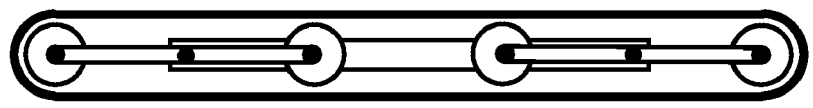
Figure 2D:
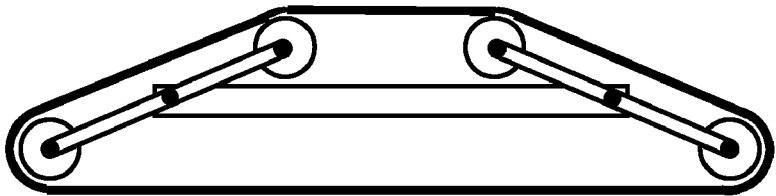

FIG. 2A shows a simplified diagram of the right track as viewed from the right side of the vehicle. Features of the invention that are visible in this figure include:

1) a vehicle chassis comprising a main body;
2) a right track;
4) a front actuated arm on the right side of the vehicle;
5) a rear actuated arm on the right side of the vehicle;
8) wheels, rotatably attached to actuated arms, that engage with and support the tracks, which are henceforth sometimes referred to as "track sprockets".

FIGS. 2A, 2B, 2C, 2D and 2E show various different track shapes that can be achieved by rotating the actuated arms. We sometimes refer to the profile of FIG. 2A as "tank" profile, FIG. 2C as "extended" profile, and FIG. 2E as "box" profile.

Figure 3A:
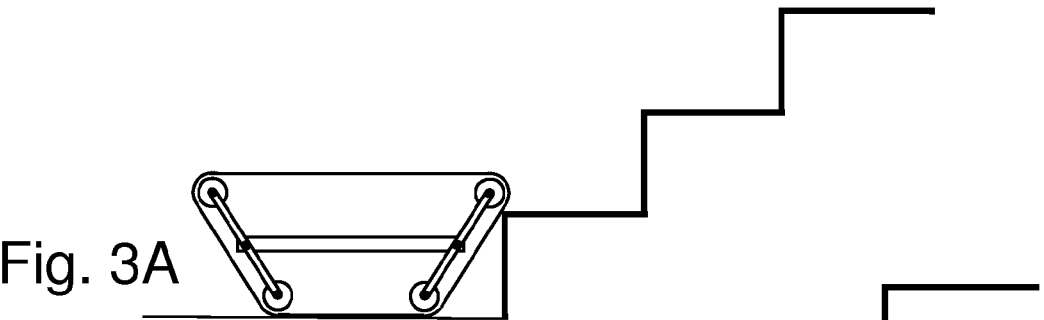
Figure 3B:
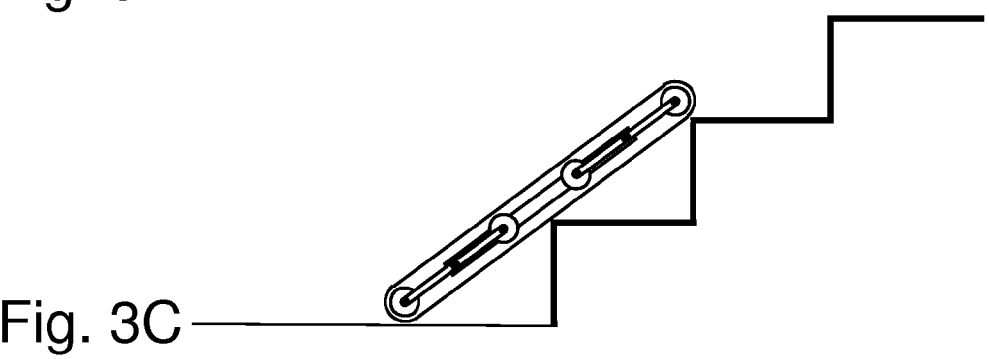
Figure 3C:
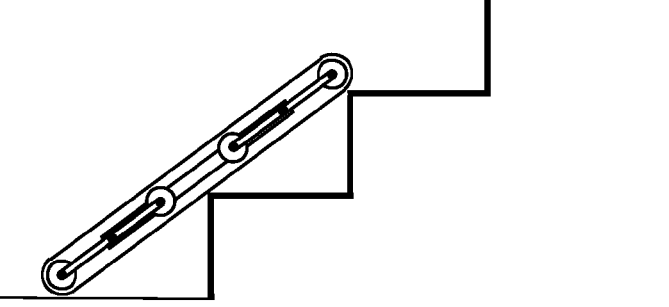
Figure 3D:
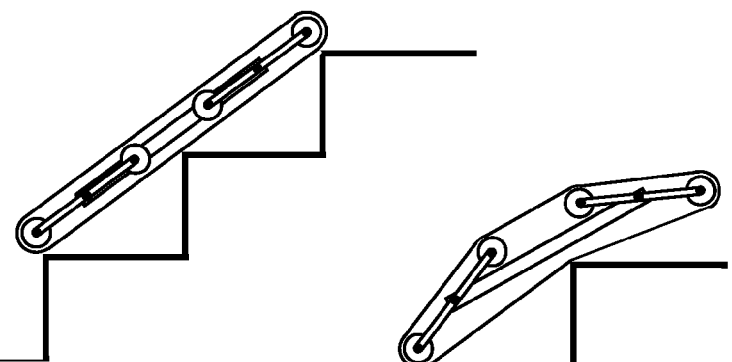
Figure 3E:

FIG. 3A to FIG. 3E show how the different configurations of the polymorphic tracks can be used to enable a polymorphic tracked vehicle to climb a flight of stairs or other obstacles. In FIG. 3A the "tank" profile is used to approach and engage the bottom step. In FIG. 3B the actuated arms are rotated, levering the vehicle onto the stairs and converting to the "extended" profile in FIG. 3C. The extended profile provides a long tracked base and low center of gravity which enables the vehicle to climb steep stairs without toppling. Sometimes it may be advantageous to adopt an "inverted tank" profile as shown in FIG. 3E when negotiating the top of the stairs, because the track slack can enable the vehicle chassis to adopt a lower angle relative to the horizontal.

Figure 4A:
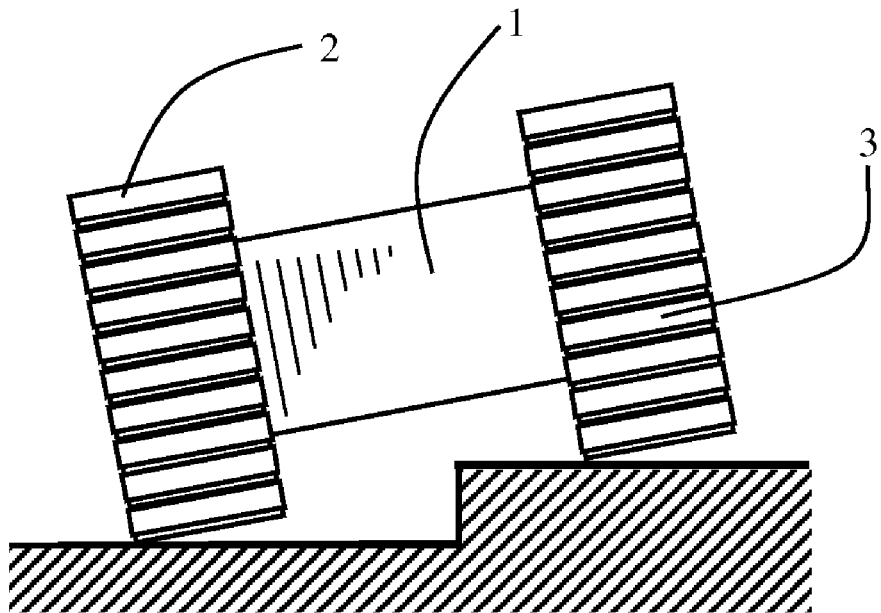
Figure 4B:
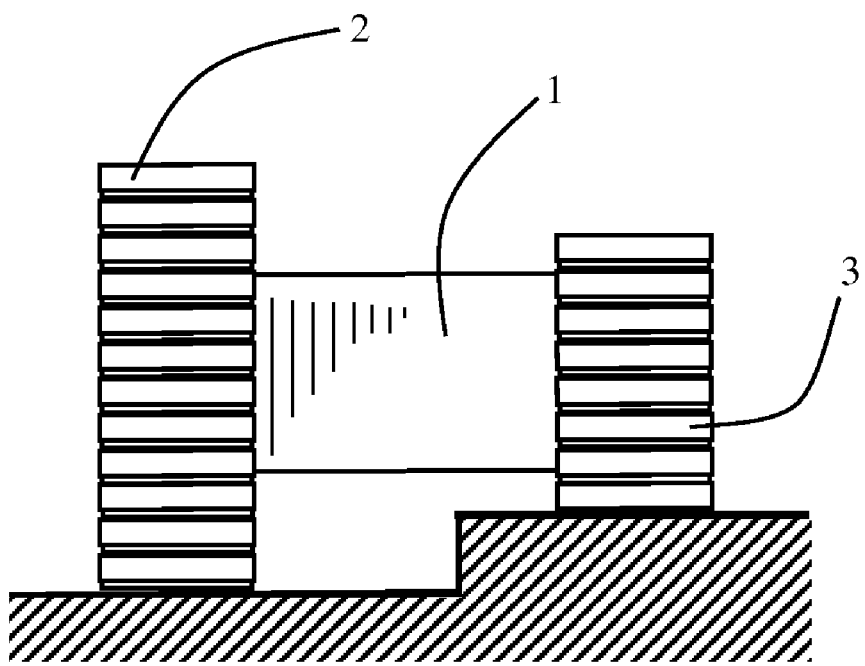

FIG. 4A and FIG. 4B together illustrates how a self leveling capability (an ability to control the angle of the vehicle chassis or body relative to the ground) of the polymorphic tracked vehicle results from the ability to independently vary the shapes of the left and right tracks. FIG. 4A and FIG. 4B show front side views of a possible embodiment of the invention. Features of the invention that are visible in this figure include:

1) a vehicle chassis comprising a main body;
2) a right track;
3) a left track;

This self leveling capability is particularly advantageous in applications where a pan-tilt weapon or camera turret is mounted on the vehicle and where it is desirable to match the plane of rotation of the turret with the horizon. The self leveling capability results from the ability of the polymorphic track system to independently change the shape of the left and right tracks, enabling level keeping on rough or inclined terrain. FIG. 4A shows the vehicle in a tilted position due to uneven terrain. FIG. 4B shows the results of using the polymorphic track system for level keeping.

FIG. 5A and FIG. 5B show one possible embodiment of a mechanism by which power can be delivered to independently actuate an arm and drive a track, i.e. a mechanism by which rotational energy can be delivered independently to one of the actuated arms and to a track or belt which is supported by the sprockets or wheels mounted on said arm. This enables the speed and steering of the vehicle to be controlled independently of the track shape. FIG. 5A shows a side view of this mechanism and FIG. 5B shows a cut section through the mechanism, the cut section being as indicated in FIG. 5A. Features of one possible embodiment of the invention which are visible in these figures include:

1) the chassis of the vehicle;
4) actuated arm;
8) track sprockets, rotatably attached to actuated arms, that engage with and support the tracks (not shown);
9) a tubular or toroidal structure, rigidly attached to the actuated arm, and rotatably attached to the vehicle chassis about a transverse axis which is perpendicular to the plane of the actuated arms and tracks. By applying a torque to this structure, it is possible to cause the actuated arm to rotate, independently of the rotation of the drive shaft (11) which passes through the structure. Note that this embodiment is merely exemplary, and there are many other ways to deliver energy to an actuated arm as described later in this document, which are also included within the scope of the invention.
10) a sprocket rigidly attached to the tubular or toroidal structure of (9). In one possible exemplary embodiment of the invention, a chain and gear train are used to connect this sprocket to an electric motor, thus enabling the actuated arm to be rotated.
11) Drive shaft. In one possible embodiment of the invention, this passes through the tubular or toroidal structure (10) and delivers power to the track.
12), 13), 14), 15) Drive sprockets. These deliver power from the drive shaft to the track sprockets (8). In one possible embodiment of the invention, two chains (not shown in the figure) are used to connect these sprockets. In this exemplary embodiment, one chain engages with and functionally connects sprocket (12) to sprocket (15) and a second chain engages with and functionally connects sprocket (13) to sprocket (14), thus enabling torque to be transmitted from the drive shaft (11) to the shafts (16) on which the track sprockets (8) are mounted, thus driving any track which may be meshed with the teeth of the track sprockets. Note that a person skilled in the art could easily employ a variety of alternative mechanisms (e.g. a series of meshed gears) to deliver power from the drive shaft (11) to the track sprockets (8) without departing from the spirit of the invention, and these alternative mechanisms are also claimed as features of the present invention.
16) Track sprocket mounting shafts. These are shafts on which the track sprockets (8) are mounted, and which are rotatably connected to the arm (4).

Figure 6:
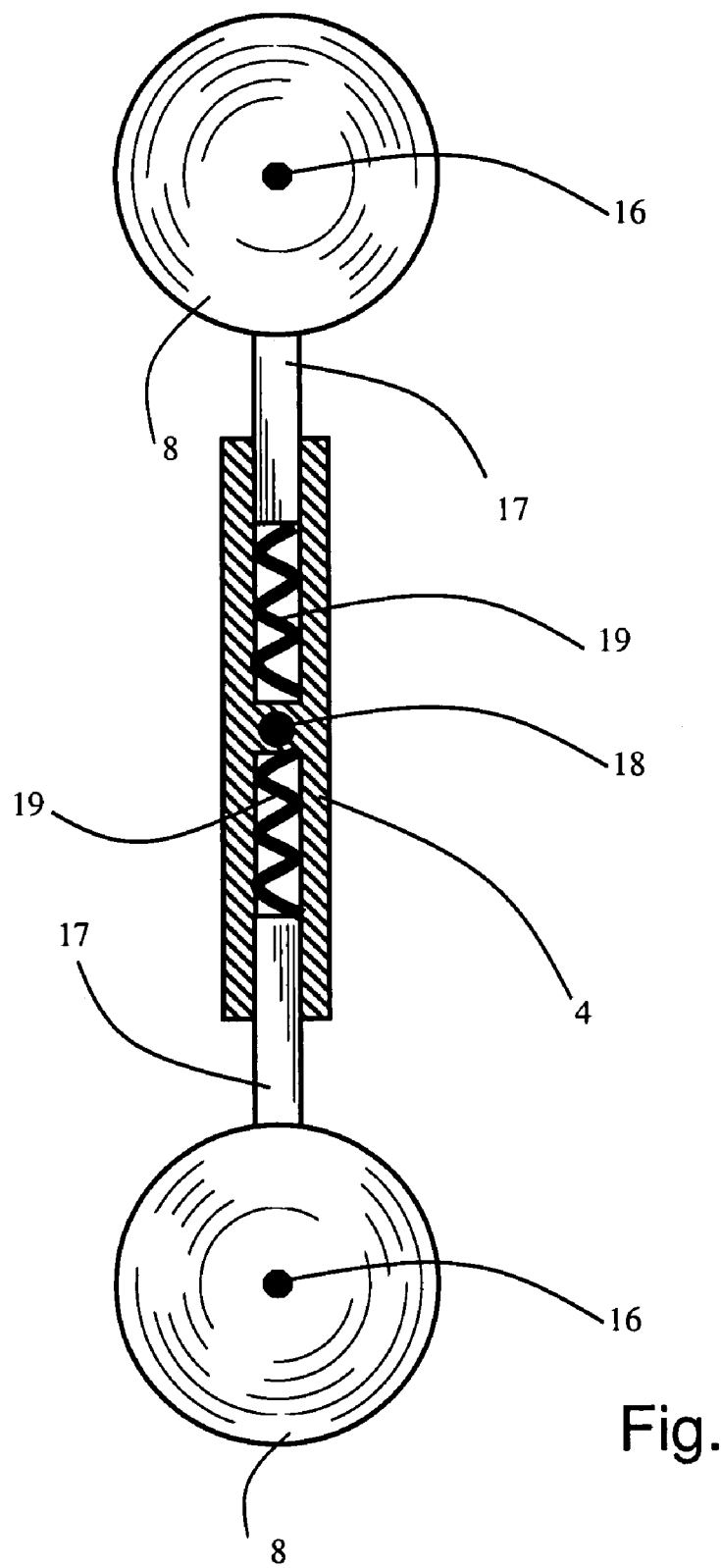

FIG. 6 shows a possible embodiment of an actuated arm, which includes a spring mechanism which may be useful for providing track tensioning and suspension for the vehicle. Features of the invention that are visible in this figure include:

4) an actuated arm;
8) wheels or track sprockets, rotatably attached to actuated arms;
16) track sprocket mounting shafts. These are shafts on which the track sprockets (8) are mounted, and which are rotatably connected to the arm (4);
17) rods or extendable members, to which are rotatably attached the track sprockets (8), via the mounting shafts (16);
18) a shaft, tubular, or toroidal structure or other means of rotatably attaching the actuated arm (4) to the vehicle chassis (1);
19) springs, which push outwards on the rods (17), exerting a force on them which tends to extend them against the track (2) with which the wheels (8) engage.

Figure 7:
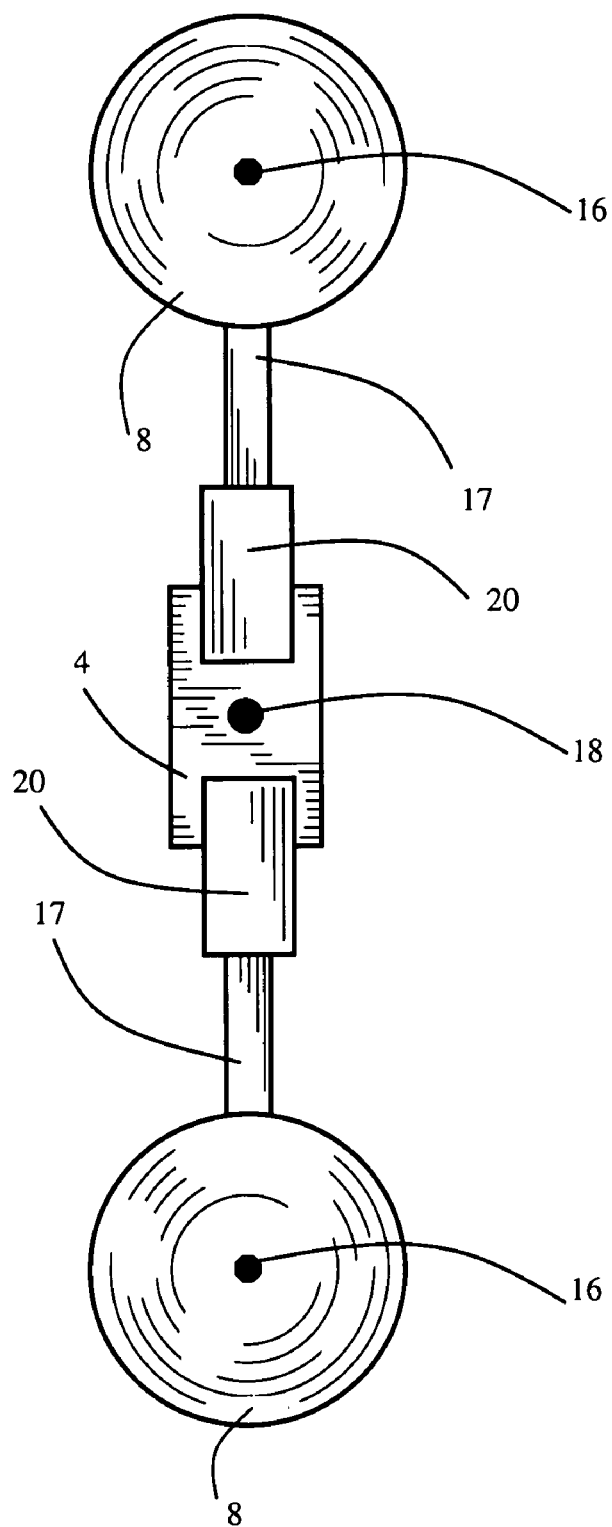

FIG. 7 shows a possible embodiment of an actuated arm, which includes linear actuators which may be useful for controlling the track tension for the vehicle. Features of the invention that are visible in this figure include:

4) an actuated arm;

8) wheels or track sprockets, rotatably attached to actuated arms;

16) track sprocket mounting shafts. These are shafts on which the track sprockets (8) are mounted, and which are rotatably connected to the arm (4);

17) rods or extendable members, to which are rotatably attached the track sprockets (8), via the mounting shafts (16);

18) a shaft, tubular, or toroidal structure or other means of rotatably attaching the actuated arm (4) to the vehicle chassis (1);

20) linear actuators, comprising pneumatics or hydraulic pistons or electric motors or other means of actuation, which functionally interface with the rods (17), extending them outwards or withdrawing them inwards, thus varying the position of the wheels (8) along the arm, with respect to the mid-point of the arm.

Figure 8:
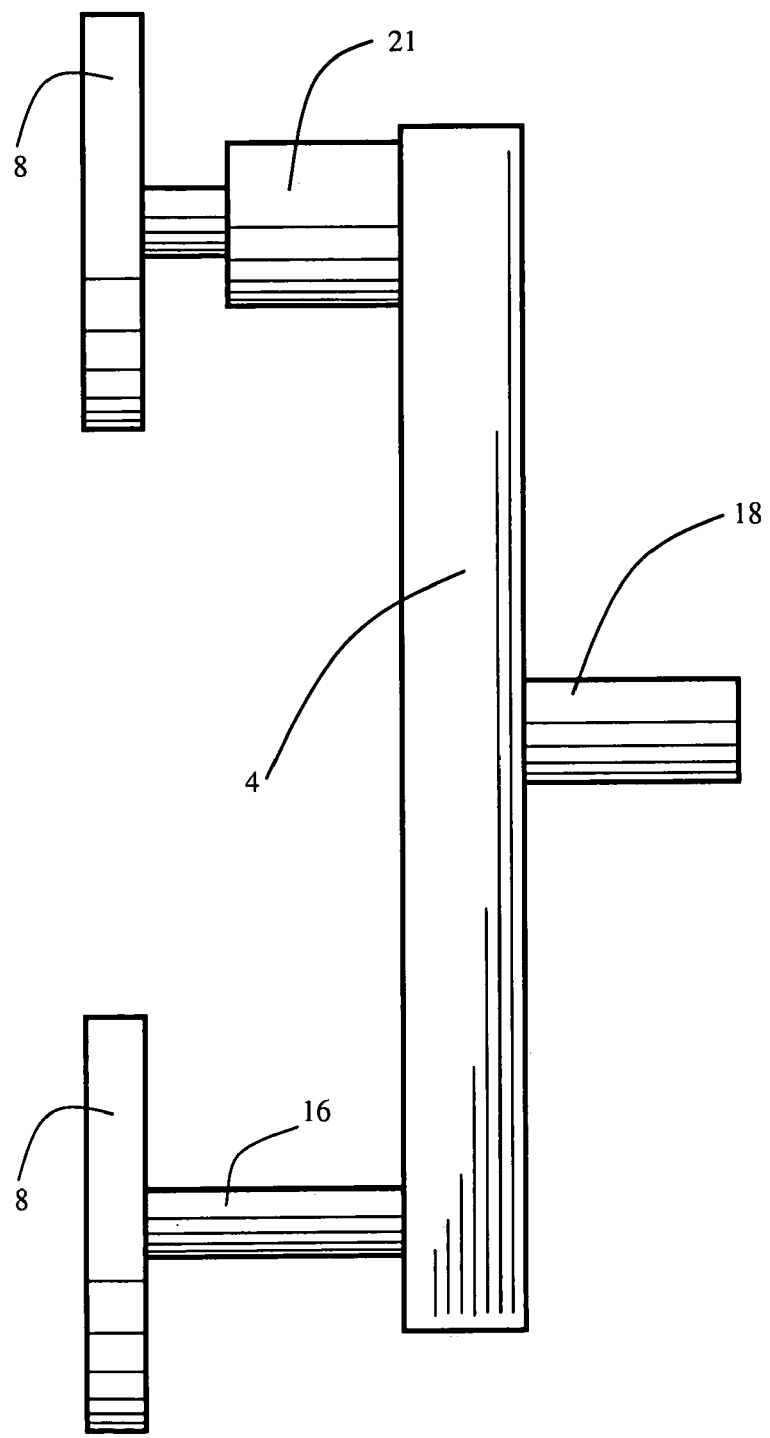

FIG. 8 shows a possible embodiment of an actuated arm, wherein a wheel or track sprocket can be driven directly by a motor mounted on said arm, without any need to transmit power from a remote motor, mounted within the vehicle main body, via a shaft passing through a toroidal structure as shown in FIG. 5A and FIG. 5B, or via other means as may be known to a person skilled in the art. Features of the invention that are visible in this figure include:

4) an actuated arm;

8) wheels or track sprockets, rotatably attached to actuated arms;

16) track sprocket mounting shaft (16);

18) a shaft, tubular, or toroidal structure or other means of rotatably attaching the actuated arm (4) to the vehicle chassis (1);

21) a motor, attached to the arm (4) and which is functionally attached to at least one wheel (8) so that it can cause said wheel to rotate.

SUMMARY OF THE INVENTION

The present invention comprises a polymorphic tracked vehicle and methods for its operation. Embodiments of a polymorphic tracked vehicle may include manned or unmanned (e.g. autonomous, semi-autonomous or tele-operated robot) tracked vehicles, built to a variety of sizes or scales. An important feature of the invention is a mechanism which enables the shape of the vehicle's tracks to be modified during operation.

Figure 2E:
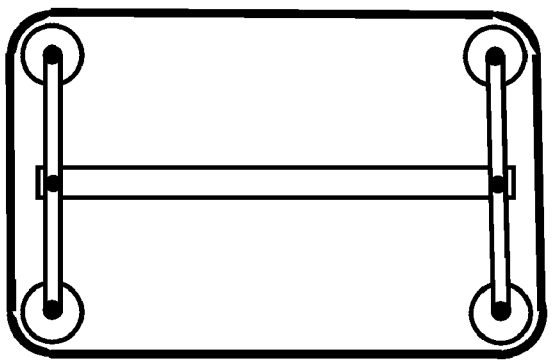

In an exemplary embodiment of the present invention, a polymorphic tracked vehicle comprises a chassis with left and right sides, and a left and right track. Each track extends around at least four wheels or "track sprockets", at least one of which is powered so as to enable the track to be driven. The four wheels support the track so that it always forms the approximate shape of an isosceles trapezoid, each wheel center being located at one vertex of said trapezoid. The at least four wheels include a pair at the front of the vehicle and a pair at the rear of the vehicle. Each such pair is mounted on opposite ends of an arm which can be rotated about its center, the axis of rotation being perpendicular to the plain of the track and wheels. Rotating these arms causes the shape of the trapezoidal track locus to be altered (moving the upper and lower sides of the trapezoidal track either closer together or further apart and thereby raising or lowering the chassis of the vehicle relative to the ground). FIG. 2 shows some of the variety of different trapezoidal track shapes which can be achieved by using this mechanism. Note that the shapes of FIG. 2C and FIG. 2E might not be obviously described as trapezoids, however, geometrically these could be considered special cases or extreme or degenerate forms of the trapezoid, i.e. in FIG. 2C the trapezoid has deformed until all four sides collapse onto a single line, whereas FIG. 2E is a special case of a trapezoid where it becomes a rectangle.

The functionality of the polymorphic track system is advantageous over the prior art and is useful for several reasons, including:

1) By changing the shape of the left and right tracks independently, the angle of tilt (from right to left) of the vehicle chassis can be controlled, for example enabling a self leveling capability of the vehicle (see FIG. 4A and FIG. 4B). This is particularly useful in military applications where a pan-tilt weapon turret may be mounted on the vehicle chassis, or when a remotely monitored pan-tilt camera system is mounted on the vehicle chassis. In such applications it is desirable to be able to level the pan-tilt turret with respect to the horizon, independently of the pitch of the underlying terrain.

2) Different shapes of tracks are optimal for different terrains and negotiating different obstacles, and it is therefore advantageous for a single vehicle to possess a polymorphic track system which enables the shape of the tracks to be varied during operation. When negotiating rough terrain, it may be desirable to utilize a "box" shape of track (see FIG. 2E) which provides large ground clearance, or the "tank" shape of track (see FIG. 2A) which enables the track to engage large obstacles or the edge of a step. In contrast, when driving the vehicle up a flight of stairs, it is desirable to adopt an "extended" shape of track (see FIG. 2C) where the vehicle is as long as possible and maintains a low center of gravity. This helps prevent the vehicle from toppling on steep stairs, and enables steeper stairs to be attempted than would be possible with, for example, the "box" shaped tracks of FIG. 2E. The long and low shape of FIG. 2C may also be advantageous in applications where a firearm is to be discharged from the vehicle, to better handle the resulting recoil effects.

3) The trapezoidal geometry of the polymorphic track mechanism, means that a constant track length is preserved, regardless of the actuation of the rotatable arms (4), (5), (6), (7). This means that it is possible to vary the shape of the tracks without necessitating tracks which are elasticated or "stretchy" as are employed in some other vehicles and without employing excessively complicated track actuation mechanisms. This, in turn means that the design can be readily scaled up to enable large vehicles which necessitate heavy duty steel tracks or tracks made from other effectively inextensible materials.

DETAILED DESCRIPTION OF A PREFERRED EMBODIMENT OF THE INVENTION

Some features of the polymorphic tracked vehicle include:

A main section, body or chassis including a main frame with left and right sides, (1).

A pair of parallel tracks or belts, operably attached to the left, (2), and right, (3) sides of the vehicle.

A pair of arms on each side of the vehicle, comprising front (4) and rear (5) arms on the right side of the vehicle (the right pair of arms), and front (7) and rear (6) arms on the left side of the vehicle (the left pair of arms), each arm being rotatably attached to the chassis about a transverse axis allowing rotation of the arm about the transverse axis (an axis perpendicular to the plane of the arms and the track which they support), wherein the transverse axis of rotation for each arm passes through the mid-point along the length of that arm.

An actuation system consisting of a transmission, actuator, and linkage to each arm which enables each pair of arms to be rotated in synchronous motion.

Rotatably attached to each such arm, at least two wheels or sprockets (8), at least one such wheel or sprocket located near to each end of the arm, said outer-most wheels at each end of said arm being positioned equi-distantly from the mid-point along said arm, through which passes the axis of said arm's rotational attachment to the chassis. These wheels interface with and support the tracks, i.e. each track belt extends around the at least four wheels (mounted on two arms) on its side of the vehicle. We sometimes refer to these wheels or sprockets as "track sprockets". Note that the left and right sides of the vehicle each only require a single track. The single track on the left side of the vehicle passes around all wheels or track sprockets of all arms on the left side of the vehicle. The single track on the right side of the vehicle passes around all wheels or track sprockets of all arms on the right side of the vehicle.

At least one drive system and preferably two independent drive systems for driving the left and right tracks in order to propel the vehicle, each such drive system consisting of at least one motor, engine or other actuator, and associated transmissions and linkages, to cause at least one of the wheels or "track sprockets" to rotate, thereby driving the track which that wheel or track sprocket supports. There are many alternative mechanisms by which a person skilled in the art could arrange a power source to deliver independent power to each track. For example, two independent motors could be used, one for the right track and one for the left track. Alternatively, a single engine or motor could be used in conjunction with a system of clutches or other transmission system to enable the left and right tracks to be controlled independently. Alternatively, multiple motors could be used to power more than one wheel or track sprocket on each side of the vehicle. All such methods are intended to be included within the scope of the present invention.

A method for ascending stairs as described in FIG. 3 and associated textual description of the figure.

A method for level keeping or self leveling of the vehicle chassis or body. The geometry of the left and right tracks can be independently modified since the arms on each side of the vehicle can be actuated independently. Thus the depth of the tracks and the corresponding height of the vehicle body from the ground can be changed independently on the left and right sides of the vehicle. This feature of the present invention can be used to adjust the angle of inclination of the vehicle body, or a platform thereon, to achieve level keeping when traversing rough or inclined terrain (see FIG. 4).

Either a human operator can control the heights of the left and right sides of the vehicle, or a feedback control system can be used to achieve automatic level keeping. This feedback control system comprises a tilt sensor or other transducer or apparatus which measures the angle of the vehicle body relative to the horizontal, and a computer, electronic or other control unit which outputs control signals to the left and right track mechanisms to make adjustments in vehicle angle relative to a desired target angle.

In one possible embodiment of the invention, at least one of the actuated arms on each side of the vehicle is rotatably connected to the chassis by a tube (tubular or toroidal structure), (9), see FIG. 5. At one end, this tube is rigidly attached to the arm, at a point midway along the arm. The tube is also rotatably attached to the vehicle chassis, such that it can rotate about a transverse axis that is perpendicular to the plain of the arms and track on the respective side of the vehicle. Thus, by using some motor or other actuator that causes the tube to rotate, e.g. in one possible embodiment by rotating the sprocket, (10), it is possible to cause the arm to rotate. In one prototype embodiment of the invention, the inventors use motors and a transmission to apply torques to the tube, causing it to rotate. However, it should be understood that this particular embodiment is merely exemplary, and that a person skilled in the art could apply many possible alternative mechanisms in order to deliver rotational energy to the actuated arms of the vehicle. For example an arrangement of hydraulic or pneumatic pistons or other kinds of actuators, connected between the arms and the vehicle chassis, could equally be used to cause the arms to rotate. Some of these mechanisms will enable complete 360 degree rotation of the arm, and others will enable a smaller range of rotation. All such variations and modifications are intended to be included within the scope of the present invention.

Another feature of the present invention comprises a drive system consisting of motors, engines or other actuators which are mechanically engaged with drive shafts (at least one for the left track and at least one for the right track) via clutches, chains, belts, gear drives or other appropriate mechanical connections. In one possible embodiment of the invention, each such drive shaft is aligned with the axis of rotation of one of the actuated arms, passing through the toroidal or tubular arm actuation structure described above. In one possible embodiment of the invention, the drive shafts pass through the actuated arms where they are then mechanically engaged with the track sprockets via belt or chain drives, gear trains or other appropriate mechanical linkages. There are a variety of ways in which the drive shaft can be made to deliver power to the track sprockets. For instance, in one possible embodiment of the invention (see FIG. 5), the drive shaft (11) is rigidly attached to one or more drive sprockets (12) and (13). Each track sprocket (8) is also mounted on a shaft (16) which is rigidly attached to a drive sprocket (14) or (15). Power can now be delivered from the drive shaft (11) to the track sprockets (8) via one or more chains that engage with the drive sprockets. In one possible embodiment of the present invention, one such chain extends around and engages with drive sprockets (12) and (15), and a second chain extends around and engages with drive sprockets (13) and (14). Hence, if the drive shaft (11) is caused to rotate, torque and rotational motion will be transmitted to the track sprockets (8) and thence to the tracks of the vehicle.

Note that the above description of one possible embodiment of the invention is merely exemplary, and that there are many other possible ways of transmitting power to the tracks of the polymorphic tracked vehicle and that these are also intended to be included within the scope of the present invention. Given a trapezoidally shaped track (2), supported by at least four wheels or track sprockets (8), mounted on two actuated arms, (4) and (5), and given some mechanism for causing the actuated arms to rotate (thus changing the track shape), any additional mechanism which delivers power to the track (2) is considered as contained within the scope of the present invention. For example, an alternative approach (which may be mechanically simpler) would be to avoid utilizing the drive shaft (11) and tubular or toroidal structure (9), and instead have at least one motor rigidly mounted on at least one of the actuated arms (and thus moving with the arms when they are actuated), said motors delivering power to the track sprockets (8) directly or via an appropriate transmission. This alternative method is also contained within the scope of the present invention. Alternatively, at least one and preferably several of the wheels or track sprockets (8) could be powered by motors embedded within said wheels or track sprockets and this alternative method is also intended to be included within the scope of the present invention.

The above description describes an embodiment of the invention where an outer tubular structure (9) delivers torque to the actuated arm while an inner drive shaft (11) passes through this tubular structure to deliver torque to the track. Note that a person skilled in the art could easily modify this concept and system to use the outer tubular structure to deliver torque to the track while using an inner shaft (passing through the tubular structure) to deliver torque to the actuated arm. In this case, the inner shaft would be rigidly attached to the actuated arm and the outer tubular or toroidal structure would be free to rotate independently of the actuated arm. The drive sprockets (12) and (13) would be attached to the tubular structure and not to the shaft as in the previously described embodiment. The drive sprockets (12), (13), (14), (15) would all be located on the inner side of the actuated arm (closest to the vehicle chassis) as opposed to on the outer side of the actuated arm (furthest away from the chassis) as in the previously described embodiment of the invention (shown in FIG. 5). This alternative mechanism for independently powering the tracks and the actuated arms is also intended to be contained within the scope of the present invention.

Note that the polymorphic track mechanism can also be combined with various mechanisms for track tensioning. There are a variety of ways in which a person skilled in the art could easily modify the invention to incorporate additional track tensioning mechanisms and devices, and it is intended that these methods also be contained within the scope of the present invention. Some examples of ways in which track tensioning can be incorporated include (but are not restricted to) the following:

1) Consider a pair of track sprockets or wheels (8) mounted at opposite ends of one of the actuated arms (4). The distance between these two track sprockets can be varied, in order to modify the track tension. Tensioning mechanisms might include (but are not restricted to) a manually adjusted set screw, springs that tend to push these two sprockets apart, or an actuator that can be operated manually by a human user or automatically by a computer or electronic control system.
2) Consider a pair of actuated arms, e.g. (4) and (5), both mounted on a common side of the vehicle. The center point of each arm is rotatably attached to the vehicle chassis. The track tension can be modified by adjusting the distance between the points of attachment of these arms, i.e. moving the point of chassis attachment of at least one of the actuated arms forwards or backwards along the vehicle chassis. Mechanisms that could be used to perform this tensioning movement might include (but are not restricted to) a manually adjusted set screw, a spring or springs that tend to push the center points of the two actuated arms apart, or an actuator that can be operated manually by a human user or automatically by a computer or electronic control system.
3) Many methods of tensioning tracks are well known to persons skilled in the art and could be applied to the polymorphic tracked vehicle. Such systems might include (but are not restricted to) additional rollers, sliders, arms or other mechanisms that pull or push on the tracks at one or more points to help maintain the track tension. All such methods, when applied to the polymorphic tracked vehicle, are intended to be contained within the scope of the present invention.

Note that the system, of supporting the track with track sprockets mounted on arms that are rotatably attached to the vehicle chassis, can also be used to provide a compliant or shock absorbing suspension for a tracked vehicle. If the rotation of the arms is resisted by springs (or actuators controlled so as to provide a spring-like resistance, or other forms of shock absorbing resistance), then the trapezoidal polymorphic track mechanism can be used to provide a shock absorbing suspension system for tracked vehicles. These kinds of modifications and this suspension application are also intended to be included within the scope of the present invention.

Note that instead of an inelastic track which interfaces with track sprockets (8), an elastic belt could be driven by smooth rollers or wheels through frictional contact. This alternative might be especially relevant for small scale embodiments of the invention and this or similar modifications are intended to be included within the scope of the present invention.

Note that in one possible embodiment of the invention (see FIG. 5), chains interfacing with toothed sprockets were used to transmit power between two rotating shafts. It should be noted that this approach is merely exemplary, and persons skilled in the art could produce similar results with a variety of alternative well known methods, such as using elastic belts supported by smooth rollers or wheels, or sequences of meshed gears, or other simple mechanical transmissions, and that the use of these or other techniques to deliver power to the tracks or actuated arms of the polymorphic tracked vehicle are intended to be included within the scope of the present invention.

It should be understood that the embodiments described herein are merely exemplary and that a person skilled in the art may make many variations and modifications thereto without departing from the spirit and scope of the present invention. All such variations and modifications are intended to be included within the scope of the invention.

BENEFITS OF THE INVENTION

The present invention comprises a polymorphic tracked vehicle. The invention has advantages over the prior art, in that it provides a novel mechanism by which the shape of a vehicle's tracks may be varied during operation. Some specific examples of advantageous applications of the invention include:

During operation of the vehicle, raising the height of the vehicle's main body to increase ground clearance for negotiating obstacles or rough terrain.
During operation of the vehicle, reducing the height of the vehicle's main body so as to lower the center of gravity, thus making the vehicle less prone to toppling when driving up steep stairs, and more robust to recoil when a vehicle mounted firearm is discharged.
During operation of the vehicle, extending the length of the vehicle's tracked base, thus making the vehicle less prone to toppling when driving up steep stairs, and more robust to recoil when a vehicle mounted firearm is discharged in a forwards or backwards direction.
During operation of the vehicle on inclined or rough terrain, independently varying the depth of the left and right tracks so as to effect self leveling of the main body of the vehicle and any weapons or surveillance apparatus mounted thereon.

The embodiments of the invention in which we claim an exclusive property or privilege are defined as follows:

1. A polymorphic vehicle, comprising:
   a) a chassis including a main body with left and right sides;
   b) a left pair of arms on the left side of the vehicle, comprising front and rear arms, each arm being rotatably attached to the chassis about a transverse axis, allowing rotation of the arm about said transverse axis, wherein said transverse axis passes through the mid-point along the length of said arm;
   c) a right pair of arms on the right side of the vehicle, comprising front and rear arms, each arm being rotatably attached to the chassis about a transverse axis, allowing rotation of the arm about said transverse axis, wherein said transverse axis passes through the mid-point along the length of said arm;
   d) for each pair of arms, an actuation system consisting of a transmission, actuator, and linkage, which enables said pair's front and rear arms to be rotated in synchronous motion;
   e) rotatably attached to each such arm, at least two wheels or track sprockets, at least one such wheel or track sprocket located near to each end of said arm, said outermist wheels at each end of said arm being positioned equi-distantly from the mid-point along said arm, through which passes the axis of said arm's rotational attachment to the chassis;
   f) at least one drive system and preferably two independent drive systems, comprising at least one motor, engine or other actuator, and associated transmissions and linkages, to cause at least one of the wheels or track sprockets on each side of the vehicle to rotate;
   g) a single right and a single left track belt, each belt extending around, supported by and operably interfacing with all of the wheels or track sprockets mounted on the right and left pairs of arms respectively, such that causing any wheel or track sprocket to rotate will drive the track belt with which said wheel or track sprocket interfaces.

2. A polymorphic vehicle as claimed in claim 1, further including a remote control unit, operably connected to the vehicle.

3. A polymorphic vehicle as claimed in claim 2, wherein the remote control unit is connected by way of radio frequency.

4. A polymorphic vehicle as claimed in claim 1, further including a motorized pan-tilt platform, mounted on the chassis.

5. A polymorphic vehicle as claimed in claim 1, further including a robotic arm or other manipulating device mounted on the chassis.

6. A polymorphic vehicle as claimed in claim 1, further including a firearm or other weapons system, mounted on the chassis.

7. A polymorphic vehicle as claimed in claim 1, further including accessories attached thereto, wherein said accessories are chosen from the group consisting of image capture devices, visible light cameras, infra red cameras, time of flight cameras, microphones, range finders, lasers, biochemical sensors, radiation sensors, x-ray equipment, disrupters; and also including wireless equipment, standard sensors and combinations thereof.

8. A polymorphic vehicle as claimed in claim 1, wherein at least one wheel or track sprocket is compliant to impact.

9. A polymorphic vehicle as claimed in claim 1, wherein at least one of the rotatable arms is compliant to impact.

10. A polymorphic tracked vehicle as claimed in claim 1 further including a track tensioning device.

11. A polymorphic, vehicle as claimed in claim 10, wherein springs mounted inside at least one of the rotatable arms push outwards on the mounting mechanisms of at least one of the wheels or track sprockets, thereby maintaining tension in the track belt with which said wheel or track sprocket interfaces.

12. A polymorphic vehicle as claimed in claim 10, wherein actuators mounted on the rotatable arms can be used to alter the position along the arm at which at least one of the wheels or track sprockets is mounted, thereby controlling the tension in the track belt with which said wheel or track sprocket interfaces.

13. A polymorphic vehicle as claimed in claim 1, wherein at least one of the rotatable interfaces between the chassis and the arms, and any mechanisms and control systems associated with said interfaces, are designed such that said interfaces provide elastic or damped elastic mechanical impedance in response to torsional disturbances, thereby providing a springy, shock absorbing suspension for said vehicle.

14. A polymorphic vehicle as claimed in claim 1, wherein at least one arm is rotatably connected to the chassis via a rotatable toroidal structure, whereby power can be delivered to at least one wheel or track sprocket mounted on said arm, via a rotating shaft which passes through the center of said toroidal structure, such that said shaft and said toroidal structure may rotate independently of each other.

15. A polymorphic vehicle as claimed in claim 1, wherein pistons or other linear actuators are functionally connected between the chassis and at least one of the arms, thereby providing a means of causing said arms to rotate with respect to said chassis.

16. A polymorphic vehicle as claimed in claim 1, wherein at least one motor is mounted on at least one rotatable arm, and wherein said motor is functionally connected with at least one wheel or track sprocket mounted on said arm, in order to deliver rotational power to said wheel or track sprocket.

17. A method for operating a polymorphic tracked vehicle, having a front arm and rear arm rotatably attached to each side of the vehicle at the mid-points of said arms, with wheels or track sprockets rotatably attached to each arm, and with single left and single right track belts which each extend around all of the rotatable wheels or track sprockets on the left and right sides of the vehicle respectively, so as to cause the vehicle to climb a series of stairs having a rise in elevation at the first stair and at each subsequent stair, comprising:
   a) rotating the arms so that the highest part of at least one track belt is raised at least as high as the rise of the first stair;
   b) driving at least one of the track belts, so as to propel the vehicle towards the stairs, until at least one of the track belts contacts the first stair;
   c) rotating the anus on at least one side or the vehicle in order extend the tracked base or the vehicle;
   d) driving at least one of the track belts so as to propel the vehicle tip the series of stairs.

18. A method for operating a polymorphic tracked vehicle, having a front arm and rear arm rotatably attached to each side of the vehicle at the mid-points of said arms, with wheels or track sprockets rotatably attached to each arm, and with single left and single right track belts which each extend around all, of the rotatable wheels or track sprockets on the left and right sides of the vehicle respectively, so as to change the height at which the main body of the vehicle is raised above the ground, comprising synchronously rotating the front and rear arms on at least one side of the vehicle, thereby causing a change in the vertical separation between the highest and lowest parts of the track, which is supported by the wheels or track sprockets which are rotatably attached to said arms, thereby causing a change in the height of at least one side of the main body of the vehicle above the ground.

19. A method for operating a polymorphic tracked vehicle, as claimed in claim 18, wherein the arms on the left side of the vehicle and the arms on the right side of the vehicle are rotated by different amounts, thereby causing a change in height above the ground of the left side of the vehicle's main body which is different from the change in height above the ground of the right side of the vehicle's main body, thereby changing the level of incline of the vehicle's main body relative to the ground, and thereby providing a means for self leveling of the vehicle when it is on inclined or uneven terrain.

* * * * *